No. 824,859. PATENTED JULY 3, 1906.
G. GOODCHILD.
LEAF GUARD ATTACHMENT.
APPLICATION FILED AUG. 31, 1905.
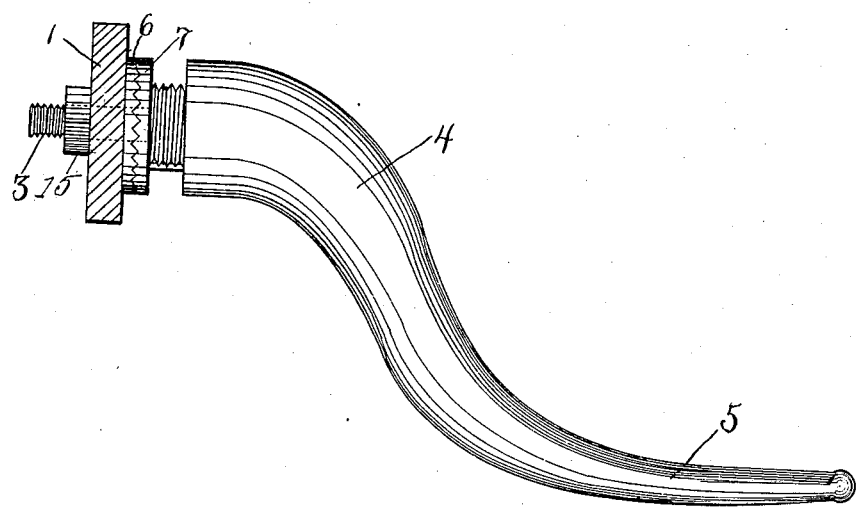
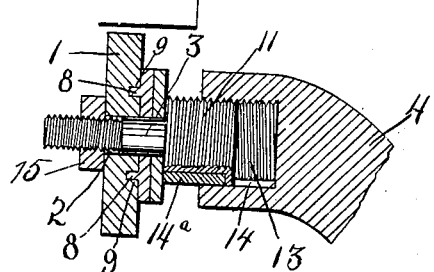
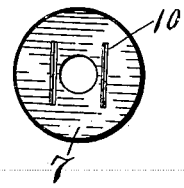
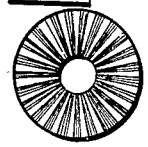
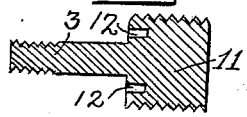
Witnesses
George Goodchild
Inventor
by Shepherd & Parker
Attorneys.

UNITED STATES PATENT OFFICE.

GEORGE GOODCHILD, OF LANSING, MICHIGAN.

LEAF-GUARD ATTACHMENT.

No. 824,859.  Specification of Letters Patent.  Patented July 3, 1906.

Application filed August 31, 1905. Serial No. 276,589.

*To all whom it may concern:*

Be it known that I, GEORGE GOODCHILD, a citizen of the United States, residing at Lansing, in the county of Ingham and State of Michigan, have invented certain new and useful Improvements in Leaf-Guard Attachments, of which the following is a specification.

This invention relates to leaf-guards, and has for its object to provide an attachment for cultivators adapted to lift the leaves of the plants out of the way of the shovels and frame.

It is a further object to provide a leaf-guard which is adapted to be adjusted with reference to the shovels, so that the best results may be obtained with a view to protecting the plants.

With these and other objects in view the present invention consists in the combination and arrangement of parts, as will be hereinafter more fully described, shown in the accompanying drawings, and particularly pointed out in the appended claims, it being understood that changes in the form, proportion, size, and minor details may be made within the scope of the claims without departing from the spirit or sacrificing any of the advantages of the invention.

In the drawings, Figure 1 is a side elevation of my improved leaf-guard. Fig. 2 is a cross-section of the adjusting mechanism. Fig. 3 is a view of the face of the outer friction-washer, showing the ribs which engage the bolt-head. Fig. 4 is a showing of one of the adjacent faces of the friction-washers, and Fig. 5 is a horizontal section of a bolt which will be hereinafter described.

In the drawings, 1 is the shovel-bar of a cultivator, provided with an aperture 2, adapted to receive bolt 3, which carries on its forward end leaf-engaging arm 4, the forward end 5 of which passes under the leaves of the plants and raises them out of the way of the cultivator-shovels. In order that the arm 4 may be adjusted for use under different conditions, I have provided two washers 6 and 7, which are carried by bolt 3. The adjacent places of these washers are roughened or serrated in order that they may be prevented from turning. Plate 6, which is next to frame 1, is provided with lugs 8, adapted to enter recess 9 in the frame for the purpose of holding said washer against turning. On the outer surface of washer 7 ribs 10 are formed, which enter grooves in the inner face of the head 11 of bolt 3. The outer periphery of bolt-head 11 is threaded and is adapted to be received in recess 13 in the upper end of arm 4, said bolt-head and recess being provided with seats 14 for key 14$^a$ for the purpose of locking said bolt and arm together.

The operation of my device is as follows: The attachment is applied to the shovel-bar by passing bolt 3 through aperture 2, provided therein. The arm 4 is adjusted with reference to the frame by removing key 14$^a$ and turning the arm in the direction desired around the threaded head 11 of the bolt. When the proper adjustment has been secured, key 14$^a$ is inserted in its seat, and with the ribs 10 in channels 12 the plate 7 is turned until the proper angular adjustment of arm 4 is obtained. By tightening nut 15 the arm will be maintained in its adjusted position, the key 14$^a$ locking the bolt and arm together and friction-washers, with their ribs 10 and lugs 8, preventing the turning of the bolt. As the cultivator moves forward the lower end 5 of the arm will engage the under sides of the leaves and lift them out of the way of the cultivator shovels and frame.

Having thus described my invention, what I claim as novel, and desire to secure by Letters Patent, is—

1. A leaf-guard attachment comprising a leaf-engaging arm provided with an internally-threaded recess, a bolt with an externally-threaded head adapted to be locked in said recess, a washer having a serrated face and adapted to be held against movement with relation to the bolt and a stationary washer having a serrated face, said faces being adapted to engage each other and prevent movement of the said washers in relation to each other.

2. A leaf-guard attachment for cultivators comprising a bolt with an externally-threaded head, friction-washers carried by said bolt, one of which is provided with lugs adapted to engage the frame and the other with ribs adapted to engage the bolt-head, a leaf-engaging arm provided at one end with an internally-threaded recess adapted to receive the bolt-head, and a key adapted to lock said bolt-head and arm together.

In testimony whereof I affix my signature in presence of two witnesses.

GEORGE GOODCHILD.

Witnesses:
W. A. FRASER,
S. W. FRASER.